United States Patent
Jung et al.

(10) Patent No.: US 12,410,542 B2
(45) Date of Patent: Sep. 9, 2025

(54) POLYACRYLONITRILE-BASED STABILIZED FIBER, CARBON FIBER, AND MANUFACTURING METHOD THEREFOR

(71) Applicant: HS HYOSUNG ADVANCED MATERIALS CORPORATION, Seoul (KR)

(72) Inventors: Hee Rok Jung, Gyeonggi-do (KR); Deuk-jin Lee, Seoul (KR); Cheol Kim, Gyeonggi-do (KR)

(73) Assignee: HS HYOSUNG ADVANCED MATERIALS CORPORATION, Seoul (KR)

( * ) Notice: Subject to any disclaimer, the term of this patent is extended or adjusted under 35 U.S.C. 154(b) by 482 days.

(21) Appl. No.: 18/007,191

(22) PCT Filed: Jul. 27, 2021

(86) PCT No.: PCT/KR2021/009726
§ 371 (c)(1),
(2) Date: Jan. 27, 2023

(87) PCT Pub. No.: WO2022/030854
PCT Pub. Date: Feb. 10, 2022

(65) Prior Publication Data
US 2023/0235485 A1    Jul. 27, 2023

(30) Foreign Application Priority Data
Aug. 4, 2020  (KR) .................. 10-2020-0097359

(51) Int. Cl.
*D01F 6/18* (2006.01)
*D01D 5/04* (2006.01)
(Continued)

(52) U.S. Cl.
CPC ................ *D01F 6/18* (2013.01); *D01D 5/04* (2013.01); *D01D 5/06* (2013.01); *D01D 10/06* (2013.01); *D01F 9/225* (2013.01); *F17C 1/06* (2013.01)

(58) Field of Classification Search
CPC ............. D01F 6/18; D01F 9/225; D01F 9/00; D01F 9/08; D01F 9/12; D01F 9/14; D01F 9/32; D01F 9/324; D01F 9/326; D01F 9/328; D01F 11/00; D01F 11/02; D01F 11/04; D01F 11/06; D01F 11/08; D01F 11/10;
(Continued)

(56) References Cited

FOREIGN PATENT DOCUMENTS

| JP | 59-082420 | 5/1984 |
|---|---|---|
| JP | 06-015722 B | 3/1994 |

(Continued)

OTHER PUBLICATIONS

English translation of the Written Opinion of the International Searching Authority in PCT/KR2021/009726 (Year: 2021).*
Liu, et al., Kinetics of the cyclization and isomerization reactions in polyacrylonitrile based carbon fiber precursors during thermal-oxidative stabilization, J. Appl. Polym. Sci. 2020; 48819, pp. 1-10 (Year: 2020).*

(Continued)

*Primary Examiner* — Daniel C. Mccracken
(74) *Attorney, Agent, or Firm* — HSML P.C.

(57) ABSTRACT

The present invention provides a carbon fiber, which has excellent tensile strength by having fewer internal defects while being a thick fiber having a single-fiber diameter of 6.0 μm or greater, and can provide the effects of reducing costs while increasing production amount to enhance the yieldability of the carbon fiber.

7 Claims, 1 Drawing Sheet

(51) Int. Cl.
     *D01D 5/06*   (2006.01)
     *D01D 10/06*  (2006.01)
     *D01F 9/22*   (2006.01)
     *F17C 1/06*   (2006.01)

(58) Field of Classification Search
     CPC ...... D01F 11/12; D01F 11/121; D01F 11/122; D01F 11/123; D01F 11/124; D01F 11/125; D01F 11/126; D01F 11/127; D01F 11/128; D01F 11/129; D01F 11/14; D01F 11/16; D01D 5/04; D01D 5/06; D01D 10/06; D01D 5/096; F17C 1/06; F17C 2203/0619; F17C 2203/0663; F17C 2203/0675; B60K 2015/03032; B60K 2015/03315; B60K 2015/03493; B60K 15/03; Y02E 60/32
     See application file for complete search history.

(56) References Cited

FOREIGN PATENT DOCUMENTS

| | | |
|---|---|---|
| JP | 07-037685 | 4/1995 |
| JP | 2008-202207 | 9/2008 |
| KR | 10-1407127 B | 6/2014 |
| KR | 10-2014-0148343 | 12/2014 |
| KR | 10-2016-0142538 | 12/2016 |
| KR | 10-2018-0098666 | 9/2018 |
| KR | 10-2019-0019297 | 2/2019 |

OTHER PUBLICATIONS

International Search Report issued in International Application No. PCT/KR2021/009726, Nov. 8, 2021, 5 pages w/translation.

* cited by examiner

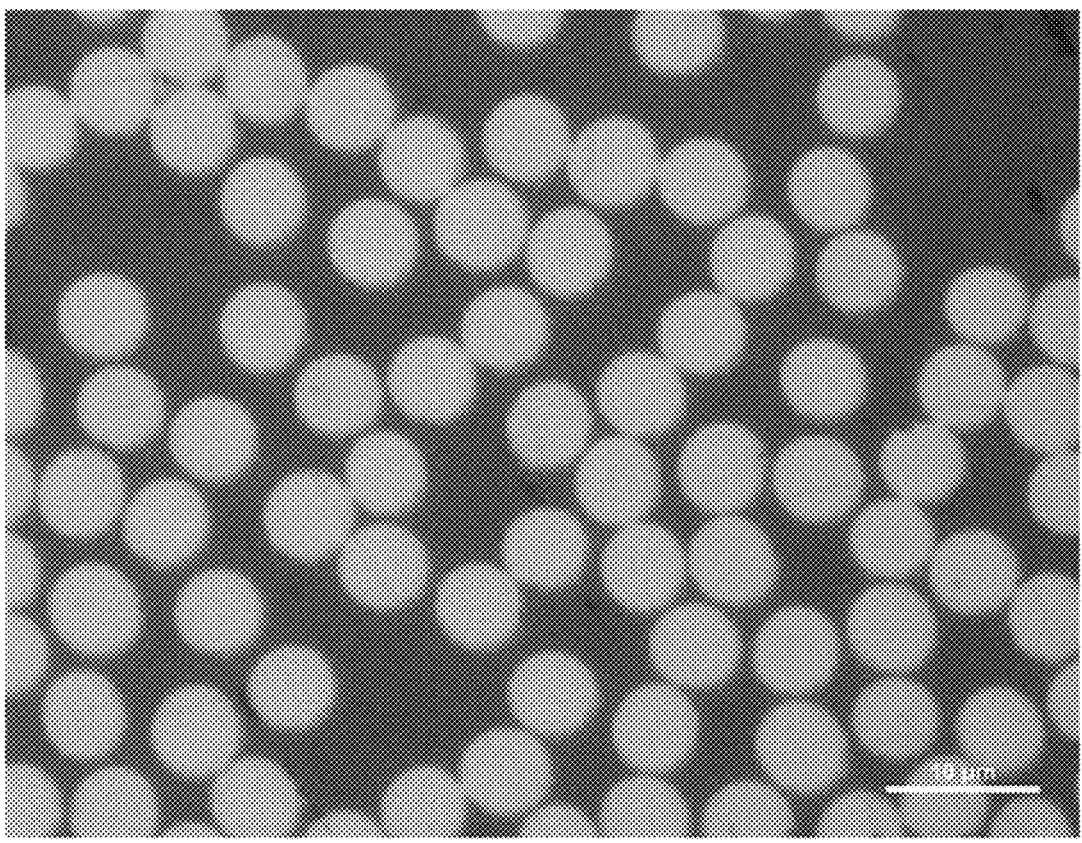

POLYACRYLONITRILE-BASED STABILIZED FIBER, CARBON FIBER, AND MANUFACTURING METHOD THEREFOR

TECHNICAL FIELD

The present invention relates to a polyacrylonitrile-based stabilized fiber, a carbon fiber, and a method for producing the same, and more particularly, to a polyacrylonitrile-based stabilized fiber which has high strength while being produced with increased productivity, a carbon fiber, and a method for producing the same.

BACKGROUND ART

Carbon fiber is lightweight and has very excellent physical properties such as high strength and high elastic modulus, and thus, is used for sporting goods such as fishing rods, golf clubs and ski boards, for forming materials for CNG tanks, flywheels, windmills for wind power generation, for reinforcements of structures such as roads and piers, and for materials for aircraft and aerospace applications, and applications thereof have been expanded. In particular, carbon fiber may be used in a hydrogen high-pressure tank(vessel) for a hydrogen fuel cell electric vehicle, fuel tanks for aerospace applications, and aerospace centrifuges, which require a high pressure of 700 bar or more and require high tensile strength. As applications of these carbon fibers have been expanded, the development of carbon fibers having higher tensile strength has been required.

As a conventional technique for increasing the tensile strength of carbon fibers, a technique for densifying undrawn yarns through optimization of a coagulation bath is disclosed in Japanese Unexamined Patent Application Publication No. Sho 59-82420 and Japanese Unexamined Patent Application Publication No. Hei 6-15722. However, this technique of increasing the density of undrawn yarns has a problem in that the oxygen permeability into carbon fiber in the oxidation process is lowered, reducing the tensile strength of the resin-impregnated strand of carbon fiber.

As another method, Japanese Unexamined Patent Application Publication No. Hei 7-37685 discloses a technique for increasing the average single-fiber tensile strength of carbon fiber to 530 kg/mm$^2$ or more by reducing the average single fiber diameter of the carbon fiber to 5.5 μm or less. However, in this technique, the effect of increasing the tensile strength can be obtained only in the case of high-fineness carbon fiber having a single-fiber diameter of less than 5.5 μm. In the case of large-fineness carbon fiber having a single-fiber diameter greater than 6.0 μm, there is a limit to improving the tensile strength by this technique. That is, when the fineness of carbon fiber is not high, there is a problem in that it is difficult to obtain high tensile strength, and when the fineness of carbon fiber is increased, there is a problem in that productivity decreases.

DISCLOSURE

Technical Problem

The present invention is intended to overcome the above-described problems occurring in the conventional art, and an object of the present invention is to provide a polyacrylonitrile-based stabilized fiber capable of producing a carbon fiber having high tensile strength and excellent productivity while having a large thickness.

Another object of the present invention is to provide a carbon fiber, which is applicable to a pressure vessel and the like, has high strength and high elongation performance, and may achieve low cost and high productivity, and a high-pressure vessel using the same.

Technical Solution

One aspect of the present invention for achieving the above objects is directed to a polyacrylonitrile-based stabilized fiber satisfying conditions of the following Equations 1 and 2 while having a single-fiber diameter of 10.0 μm or more:

$$\mathrm{Log}(\rho) \geq (\alpha/\beta)/100 \quad (1)$$

$$0.120 \leq (\alpha/\beta)/100 \leq 0.135 \quad (2)$$

where ρ denotes the density (g/cm$^3$) of the stabilized fiber, α denotes the extent of cyclization reaction (EOR (%)) in the stabilized fiber, and β denotes the oxygen content (%) in the stabilized fiber.

Another aspect of the present invention is directed to a carbon fiber which is produced by carbonizing the polyacrylonitrile-based stabilized fiber, wherein the carbon fiber has a single-fiber diameter of 6.0 μm or more, the number of filaments in a bundle of the carbon fiber is 24,000 to 36,000, and the resin-impregnated strand of the carbon fiber has a tensile strength of 5.8 to 6.4 GPa and a tensile elongation of 2.2 to 2.6%.

Still another aspect of the present invention is directed to a method for producing a carbon fiber, the method including: subjecting a polymer solution having a polymer concentration of 20 to 24 wt % to dry-wet spinning in a coagulation bath having a solvent concentration of 30 to 40 wt % and containing water and the same solvent as a solvent used for polymerization, thereby forming a carbon fiber precursor fiber; drawing the obtained carbon fiber precursor fiber through a plurality of water washing baths; applying an oil agent to the drawn yarn, followed by drying and drawing to obtain a carbon fiber precursor fiber having a degree of surface layer densification of 65 to 70% at a wavelength of 380 nm and a degree of surface layer densification of 82 to 95% at a wavelength of 430 nm; and carbonizing the carbon fiber precursor fiber at a temperature of 1,000 to 1,400° C. to have a carbon fiber diameter of 6.0 μm or more.

The polymer that is used in the method of the present may have a weight-average molecular weight (Mw) of about 120,000 to 180,000 and a ratio of weight average molecular weight to number average molecular weight (Mw/Mn) of 1.6 to 1.8.

During the spinning, the temperature difference between the polymer solution and the coagulation bath is 30° C. or lower, and the air gap is 10.0 mm or less.

Yet another aspect of the present invention is directed to a high-pressure vessel including: a pressure vessel body; and a fiber-reinforced resin layer composed of fiber-reinforced resin foamed on the surface of the pressure vessel body, wherein the fiber of the fiber-reinforced resin layer is a carbon fiber produced by carbonizing the polyacrylonitrile-based stabilized fiber, and wherein the carbon fiber has a single-fiber diameter of 6.0 μm or more, the number of filaments in a bundle of the carbon fiber is 24,000 to 36,000, and the resin-impregnated strand of the carbon fiber has a tensile strength is 5.8 to 6.4 GPa and a tensile elongation of 2.2 to 2.6%.

Advantageous Effects

In a conventional art, the single-fiber fineness of carbon fiber is increased in order to increase the tensile strength of the carbon fiber, and thus the diameter of the carbon fiber becomes less than 6.0 μm, and the elastic modulus distribution in each single fiber is narrowed, increasing the strength of the carbon fiber, but a problem arises in that the tensile modulus of the carbon fiber also increases. On the other hand, according to the present invention, it is possible to increase only the tensile strength of carbon fiber without reducing the single-fiber diameter as much as the conventional art, and thus it is possible to improve the productivity of carbon fiber by increasing the amount of carbon fiber produced, while obtaining a cost reduction effect by suppressing the increase in equipment cost as much as possible.

According to the present invention, a molding material including a carbon fiber having high strength and high elongation may be provided. The carbon fiber of the present invention has excellent resin impregnating properties and exhibits excellent strand spread during molding, and a molding material including the same exhibits high carbon fiber strength and excellent mechanical properties. The molding material is suitable for use in fiber-reinforced composite materials such as pressure vessels.

DESCRIPTION OF DRAWINGS

FIG. 1 is a cross-sectional micrograph of a carbon fiber according to an embodiment of the present invention.

BEST MODE

Hereinafter, the present invention will be described in more detail.

As used herein, the term "fiber" is meant to include a single filament or a bundle of multiple filaments (also referred to as a "tow").

As used herein, the term carbon fiber "precursor fiber" refers to a fiber including a polymeric material that may be converted to a carbon fiber having a carbon content of about 90 wt % or more, specifically about 95 wt % or more, when sufficient heat is applied thereto. The precursor fiber may include both an acrylonitrile (AN) homopolymer and a copolymer of acrylonitrile (AN). Examples of the copolymer include copolymers of acrylonitrile with methyl acrylate (MA), methacrylic acid (MAA), sodium methallyl sulfonate (SMAS), itaconic acid (ITA), vinyl bromide (VB), isobutyl methacrylate (IBMA), or combinations thereof.

One aspect of the present invention for achieving the above objects is directed to a polyacrylonitrile-based stabilized fiber satisfying conditions of the following Equations 1 and 2 while having a single-fiber diameter of 10.0 μm or more:

$$Log(\rho) \geq (\alpha/\beta)/100 \quad (1)$$

$$0.120 \leq (\alpha/\beta)/100 \leq 0.135 \quad (2)$$

where β denotes the density (g/cm³) of the stabilized fiber, α denotes the extent of cyclization reaction EOR (%) in the stabilized fiber, and β denotes the oxygen content (%) in the stabilized fiber.

In the present invention, if Log(ρ) is smaller than 0.01α/β, a problem may arise in that the structure in the cross-section of the fiber becomes a dual structure, so that the carbon fiber cannot exhibit high tensile strength. If the 0.01α/β value is less than 0.120, it is advantageous to have a uniform internal and external structure, but a problem may arise in that bonding and yarn breakage may occur during carbonization due to lack of stability of the fiber bundle, and if the 0.01α/β value is more than 0.135, a problem may arise in that the structure in the cross-section of the fiber becomes a dual structure, so that the carbon fiber cannot exhibit high tensile strength.

In order to obtain a carbon fiber with high physical properties, it is necessary to prevent a double structure in the cross section of the fiber during oxidation. The structure of this stabilized fiber should be controlled through the fineness of the precursor fiber, the temperature in an oxidation furnace, tension, residence time, air flow rate, etc., and should be a molecular structure with heat resistance.

In the stabilized fiber in the present invention, the extent of cyclization reaction (EOR %) in the stabilized fiber may be 80 to 95%, and the oxygen content may be 5 to 8%.

If the extent of cyclization reaction is less than 80%, the heat resistance of the stabilized fiber will be insufficient, and the physical properties thereof will be deteriorated during carbonization, and yarn breakage will be likely to occur. On the other hand, if the extent of cyclization reaction is more than 95%, the ladder structure and the molecular structure by oxygen will be excessively developed, resulting in a rigid structure, and thus the physical properties of the stabilized fiber will be deteriorated during carbonization.

The oxygen content in the stabilized fiber is the content of oxygen relative to the total weight of the inside and outside of the fiber. The higher the oxygen content, the better the heat resistance, but the more uniform the inside and outside of the fiber cross-section, the higher the physical properties. Thus, control should be performed so that oxygen is well diffused inside the fiber so that there is no rapid structural change, and the oxygen content in the stabilized fiber of the stabilized fiber may be in the range of 5 to 8%.

Another aspect of the present invention is directed to a carbon fiber bundle which is produced by carbonizing the above-described stabilized fiber, wherein the carbon fiber has a single-fiber diameter of 6.0 μm or more, the number of filaments in the fiber bundle is 24,000 to 36,000, and the resin-impregnated strand of the carbon fiber bundle has a tensile strength of 5.8 to 6.4 GPa and a tensile elongation of 2.2 to 2.6%.

In a preferred embodiment, the single fibers of the carbon fiber precursor fiber in the present invention may have a diameter of 9.0 μm or more, a tensile strength of 9 to 11 g/d, and an elongation of 10 to 12%.

In the carbon fiber bundle of the present invention, the single-fiber diameter of the carbon fiber is 6.0 μm or more (see FIG. 1). The average-single fiber diameter of the carbon fiber may be calculated from the mass, density and number of filaments per unit length of the carbon fiber bundle, and is measured through an optical microscope or electron microscope (SEM) for a polished carbon fiber resin tensile test specimen.

As the single-fiber diameter of the carbon fiber decreases, the difference in internal and external structure of the carbon fiber decreases, and thus the carbon fiber exhibits high-strength physical properties, but the production process is complicated and costly, and when a composite material is produced using the carbon fiber, there are disadvantages in tarns of impregnation with matrix resin, and insufficient impregnation may occur, resulting in a decrease in the tensile strength of the composite material. When the single-fiber diameter of the carbon fiber is 6.5 to 8.0 μm, it is advantageous in terms of process processability and production cost, and in the production of a composite material, the possibility of yarn breakage is reduced and there are advantages in teams of resin impregnation.

The average single-fiber diameter of the carbon fiber bundle may be increased by increasing the average single-fiber diameter of the carbon fiber precursor fiber bundle, or increasing the carbonization yield in the carbonization process through control of oxidation conditions, or lowering the draw ratio of low-temperature carbonization.

When a carbon fiber bundle with a small number of filaments is used, a large number of carbon fiber bundles need to be used. When a carbon fiber bundle with a large number of filaments is used, the number of carbon fiber bundles used is small, but the number of filaments is large. Accordingly, in any of these cases, the voids between fibers eventually become small, the fluidity of resin during molding processing becomes worse, and impregnation failure occurs or impregnation takes a long time.

In the present invention, the carbon fiber precursor fiber is a filament fiber. In addition, the number of filaments (single fibers) constituting the fiber bundle is preferably 24,000 to 36,000. The number of single fibers per fiber bundle is preferably larger from the viewpoint of improving productivity, but if the number is excessively large, uniform oxidation treatment up to the inside of the bundle cannot be achieved. The single-fiber fineness and the number of single fibers may be appropriately adjusted according to the intended use. When the number of filaments is 24,000 or more, the number of carbon fiber bobbins used in the manufacturing of a high-pressure vessel may be reduced, making work convenient, and if the number of filaments is more than 36,000, sufficient tensile strength required in the high-pressure vessel field may not be exhibited.

The tensile strength of the carbon fiber precursor fiber bundle of the present invention is 5.4 GPa or more, preferably 5.4 to 6.4 GPa. If the tensile strength is less than 5.4 GPa, the pressure vessel manufactured using a fiber-reinforced composite material including this carbon fiber bundle may not have sufficient tensile strength required for a pressure vessel requiring a high pressure of 700 bar or more.

The tensile elongation of the carbon fiber precursor fiber bundle of the present invention is preferably 2.2 to 2.6%. If the tensile elongation is lower than 2.2%, the tensile strength as a carbon fiber-reinforced composite material produced using this carbon fiber bundle becomes insufficient. The upper limit of the tensile elongation of the strand is not particularly limited, but is preferably 2.6% in consideration of the purpose of the present invention.

Still another aspect of the present invention is directed to a method for producing a carbon fiber, the method including: subjecting a polymer solution having a polymer concentration of 20 to 24 wt % to dry-wet spinning in a coagulation bath having a solvent concentration of 30 to 40 wt % and containing water and the same solvent as a solvent used for polymerization, thereby forming a carbon fiber precursor fiber; drawing the obtained coagulated yarn through a plurality of water washing baths; applying an oil agent to the drawn yarn, followed by drying and drawing to obtain a carbon fiber precursor fiber having a degree of surface layer densification of 65 to 70% at a wavelength of 380 nm and a degree of surface layer densification of 82 to 95% at a wavelength of 430 nm; and carbonizing the carbon fiber precursor fiber at a temperature of 1,000 to 1,400° C. to have a carbon fiber diameter of 6.0 μm or more.

In the present invention, it is possible to produce a carbon fiber precursor fiber bundle having increased productivity while having increased tensile strength even when the carbon fiber single fiber diameter is 6.0 μm or more. In order to make a carbon fiber precursor fiber with excellent tensile strength, it is required that a polymer solution (spinning dope) with less foreign substances and a uniform molecular weight distribution be produced through solution polymerization using a dimethyl sulfoxide solvent, and few voids and surface layer densification be achieved through optimization of a coagulation bath to ensure proper discharge stability and coagulation elongation by wet and dry spinning.

The PAN-based polymer (polyacrylonitrile-based polymer) that is used in the present invention has an intrinsic viscosity of 1.5 to 2.0 and a weight average molecular weight (Mw) of 120,000 to 180,000. As the molecular weight increases, a PAN-based precursor fiber with higher strength may be produced. In general, higher strength carbon fiber may be produced only when the PAN-based precursor fiber has a molecular weight of a certain level or higher than low-molecular-weight PAN fibers, which means that a PAN-based polymer having a molecular weight of a certain level or higher is required for production of PAN-based precursor fibers.

The molecular weight distribution (PD) (Mw/Mn) of the PAN-based polymer that is used in the present invention is preferably in the range of 1.6 to 1.8, because the content of low-molecular components that tend to cause structural defects in carbon fibers is reduced. As the molecular weight distribution (PD) of the PAN-based polymer becomes narrower, excellent spinning stretchability is obtained, and there are advantages in improving the strength of the carbon fiber.

In the present invention, if the molecular weight distribution (PD) (Mw/Mn) of the PAN-based polymer is less than 1.6, the polymerization process may require many steps and take a long time, reducing the economic efficiency, and if the PD is more than 1.8, the frequency of occurrence of gels in the polymer may increase, resulting in many single yarns such as drips from the nozzle, and the uniformity of discharge may be poor, resulting in high frequency of yarn breakage during water washing drawing or steam drawing, and the possibility that the physical properties of the precursor fiber become non-uniform may increase, causing deterioration in the physical properties and quality of the carbon fiber.

In the present invention, the polymerization method for producing the PAN-based polymer may be selected from among a solution polymerization method, a suspension polymerization method, and an emulsion polymerization method, but it is preferred to use the solution polymerization method for the purpose of uniformly polymerizing AN or a comonomer component. In the case in which polymerization is performed using the solution polymerization method, the PAN-based polymer is dissolved in a solvent such as dimethyl sulfoxide, dimethylformamide or dimethylacetamide, thus preparing a polymer solution (spinning dope). In the case in which solution polymerization is used, if the solvent used for polymerization and the spinning solvent are the same, a step of separating the obtained PAN-based polymer and re-dissolving it in the spinning solvent becomes unnecessary.

The polymer concentration of the PAN-based polymer solution is preferably in the range of 20 to 24 wt %. If the polymer concentration is less than 20 wt %, the amount of solvent used increases, which is uneconomical, and the coagulation rate in the coagulation bath may be reduced and voids may be generated in the fiber, making it impossible to obtain a dense structure. Meanwhile, if the polymer concentration is more than 24 wt %, the viscosity may tend to increase and spinning becomes difficult. The polymer concentration of the spinning dope may be adjusted by the amount of solvent used.

In the present invention, the polymer concentration is the weight % of the PAN-based polymer contained in the solution of the PAN-based polymer. Specifically, after the solution of the PAN-based polymer is weighed, the weighed PAN-based polymer solution is desolvated using a solvent which does not dissolve the PAN-based polymer and is compatible with the solvent of the PAN-based polymer solution, and then the PAN-based polymer is weighed. The polymer concentration is calculated by dividing the weight of the PAN-based polymer after desolvation by the weight of the PAN-based polymer solution before desolvation.

In order to obtain a high-strength carbon fiber before spinning the PAN-based polymer solution, it is preferable to filter the PAN-based polymer solution, for example, through a filter having a filtration accuracy of 1 μm or less to remove the monomer and impurities incorporated in each process.

In the present invention, dry-wet spinning is performed by passing a spinning dope having high viscosity while having less foreign substances and a uniform molecular weight distribution through a nozzle hole having a diameter of 0.12 to 0.18 mm. The average spinning hole diameter of the spinneret that is used in the present invention is preferably 0.12 to 0.18 mm. If the average spinning hole diameter is smaller than 0.12 mm, it may be necessary to discharge the polymer solution, which is a spinning dope, from the spinneret at high pressure, and the durability of the spinning device may decrease, and discharge from the nozzle may be difficult. On the other hand, if the average spinning hole diameter is larger than 0.18 mm, it may be difficult to obtain a coagulated yarn having a desired single fiber fineness.

In wet-dry spinning, the spinning dope discharged from the nozzle is drawn in the air and then coagulated while passing through a coagulation bath. In the present invention, the difference between the temperature of the spinning dope and the temperature of the coagulation bath is adjusted to 30° C. or lower, and the air gap created from the front of the spinning holes to the surface of the coagulation bath is 10 mm or less, preferably about 2 mm to about 8 mm. As the temperature of the spinning dope decreases, the viscosity thereof increases, and thus the pressure of discharge from the nozzle hole is sufficiently high, which can lead to an advantage in spinning stability, but it can be unfavorable to coagulation and drawing. As the temperature increases, the viscosity decreases, which can make air-gap maintenance unfavorable.

The coagulation bath that is used in the present invention is a mixture of a solvent, which is the same as the solvent of the PAN-based polymer solution and selected from among dimethylsulfoxide, dimethylformamide, dimethylacetamide, an aqueous zinc chloride solution and an aqueous sodium thiosulfate solution, and a so-called coagulation-promoting component. As the coagulation-accelerating component, it is preferable to use a material that does not dissolve the above PAN-based polymer and is compatible with the solvent of the PAN-based polymer solution. Specific examples of the coagulation-promoting component include water, methanol, ethanol, and acetone, but it is most preferable to use water.

The temperature of the coagulation bath may affect the diffusion rate of the solvent into the coagulation bath and the diffusion rate of the coagulation-promoting component into the spinning dope. Thus, as the temperature of the coagulation bath decreases, the coagulated yarn becomes denser, and high-strength carbon fiber may be obtained. If the temperature difference between the spinning dope and the coagulation bath is higher than 30° C., the coagulation phase separation unit becomes large and voids may increase, and if the temperature difference between the spinning dope and the coagulation bath is excessively small, the coagulation phase separation becomes excessively small and the surface becomes soft, so that fibrils and the like due to friction are likely to occur, causing yarn breakage.

In the present invention, the PAN-based polymer solution is introduced into the coagulation bath and coagulated to form a coagulated yarn, followed by a washing process, a bath drawing process, an oil agent application process, and a drying process to obtain a carbon fiber precursor fiber. Bath drawing may be performed in a single or multiple drawing baths usually kept at a temperature of 30 to 98° C. The draw ratio in the bath drawing process is preferably 1 to 5.

After completion of the bath drawing process, for the purpose of preventing coalescence of fibers, it is preferred to apply an oil agent composed of a silicone, etc. to the drawn bundle. As the silicone oil agent, an oil agent containing an amino modified silicone with high heat resistance may be used. For the next drying process, a known method may be used. For example, the drying process may be performed at a drying temperature of 70 to 200° C. for 10 seconds to 200 seconds.

After the drying process, a steam drawing process is performed, in which a precursor fiber may be obtained by drawing 2 to 6 times in pressurized steam. The single-fiber fineness of the precursor fiber is 0.95 dtex or more.

The carbon fiber precursor fiber produced by the above method is subjected to an oxidation process in an oxidation furnace under an air atmosphere at a temperature of 200 to 300° C. while applying a tension in the range of 7 to 12 cN/dtex thereto so that the extent of cyclization reaction (EOR) and oxygen content in a stabilized fiber are within predetermined ranges, thus obtaining a stabilized fiber having a single-fiber diameter of 10.0 to 11.5 μm.

The carbon fiber precursor fiber bundle has a degree of surface layer densification of 87.5 to 93% at a wavelength of 380 to 480 nm. If the degree of surface layer densification is less than 87.5%, voids may generate defects in the carbon fiber, which deteriorate physical properties through a carbonization process, thereby reducing the tensile strength of the composite material.

The upper limit of the degree of surface layer densification is preferably as high as possible and is not particularly limited, but is preferably 87.5% or more for the purpose of the present invention. Preferably, the degree of surface layer densification of the precursor fiber bundle for carbon fiber is 65 to 70% at a wavelength of 380 nm, and preferably 82 to 95% at a wavelength of 430 nm.

It is preferable to obtain a carbon fiber bundle by carbonizing a stabilized fiber bundle or a low-temperature carbonized fiber bundle at 1,000 to 1,400° C. in an inert atmosphere. If this carbonization temperature is lower than 1,000° C., the nitrogen content in the carbon fiber bundle may increase, and thus the strand strength may not be stably exhibited. If the carbonization temperature is higher than 1,400° C., it may be difficult to obtain a satisfactory carbonization yield.

In the present invention, low-temperature carbonization and high-temperature carbonization are performed in an inert atmosphere. The carbonization is performed so that the single-fiber diameter of the carbon fiber is 6.0 μm or more. Examples of the gas used for the inert atmosphere include nitrogen, argon, and xenon, and nitrogen is preferably used from an economic point of view.

In order to impart bundling properties to the carbon fiber, sizing treatment is performed.

As the sizing agent, a sizing agent having good compatibility with a matrix resin may be selected depending on the type of the matrix resin to be used.

Yet another aspect of the present invention is directed to a pressure vessel including: a vessel body; and a fiber-reinforced resin layer famed on the surface of the pressure vessel body. The fiber-reinforced resin layer of the pressure vessel of the present invention has a fiber-reinforced resin in which resin is impregnated into reinforcing fiber. This reinforcing fiber includes a carbon fiber produced by carbonizing a polyacrylonitrile-based stabilized fiber satisfying Equations 1 and 2 while having a single-fiber diameter of 10.0 μm, wherein the carbon fiber has a single-fiber diameter of 6.0 μm or more, the number of filaments in a bundle of the carbon fiber is 24,000 to 36,000, and the resin-impregnated strand of the carbon fiber has a tensile strength is 5.8 to 6.4 GPa and a tensile elongation of 2.2 to 2.6%.

The carbon fiber obtained in the present invention may be suitably used for aircraft parts, pressure vessels, automobile products, and sporting goods by various molding methods such as prepreg autoclave molding, resin transfer molding for fabric preforms, and filament winding molding.

In particular, according to the present invention, the tensile strength of the carbon fiber may be improved, and thus the pressure vessel of the present invention may be suitably used for fuel tanks for various transportation systems such as automobiles.

Hereinafter, the present invention will be described in more detail with reference to examples. These examples are intended for illustrative purposes only and are not intended to limit the scope of the present invention.

EXAMPLES

Comparative Example 1

99 wt % of acrylonitrile, 1 wt % of itaconic acid, 0.01 wt % of a chain transfer agent, and a DMSO solvent were mixed together so that the monomer concentration was 20 to 22 wt %, and 0.5 wt % of an initiator (AIBN) was added thereto under a nitrogen atmosphere, followed by polymerization. After mixing at 65° C. for 4 hours in an inert atmosphere, the temperature was elevated to 80° C. at regular intervals of 3 hours and maintained for 6 hours. After completion of the reaction, defoaming was performed, and then the carboxyl group of the itaconic acid of the polymer was neutralized using ammonia gas, thus producing a spinning dope having a polymer concentration of 22 wt %. The temperature of the spinning dope was set to have a difference of 20° C. from the coagulation bath temperature, and the spinning dope was discharged into a coagulation bath having a DMSO concentration of 30 to 40 wt % while performing dry-wet spinning using a 6 to 8K nozzle. After passing through the coagulation bath, the coagulated yarn was washed through multiple washing baths, and then then drawn in hot water, and an amino-modified silicone-based silicone oil agent was applied thereto. The resulting drawn fiber bundle was moved by a plurality of heated rollers in order, and subjected to dry heat treatment. Next, the fiber bundle was drawn at a maximum draw ratio of about 80% in pressurized steam at a temperature of 140 to 185° C., thus producing a polyacrylonitrile-based precursor fiber bundle. The precursor fiber bundle was placed in an oxidizing furnace, and temperature and shrinkage were controlled so that the oxidation tension in the air was 20 cN/tex or less and the density of the stabilized fiber was 1.35 or less. Then, the stabilized fiber bundle was subjected to low-temperature carbonization at 300 to 700° C. in a nitrogen atmosphere and high-temperature carbonization at a temperature of 1,100° C. to 1,400° C. in a nitrogen atmosphere so that the carbonization tension was 15 cN/tex or less, thus obtaining a carbon fiber bundle.

The single-fiber diameter of the carbon fiber bundle was adjusted by adjusting the single-fiber diameter of the precursor fiber bundle and carbonization conditions, and the single fiber diameter of the precursor fiber bundle was adjusted by adjusting the discharge amount of the spinning dope.

Comparative Example 2

A polyacrylonitrile-based precursor fiber bundle was produced by performing polymerization and spinning in the same manner as in Comparative Example 1, except that the discharge amount of the spinning dope was 70% of that in Comparative Example 1, and spinning conditions were changed as shown in Table 1 below.

Example 1

A precursor bundle was produced by performing polymerization and spinning in the same manner as in Comparative Example 1, except that the discharge amount of the spinning dope was 90% of that in Comparative Example 1. Then, oxidation and carbonization were performed to obtain a carbon fiber bundle.

Comparative Example 3

A polyacrylonitrile-based precursor fiber bundle was produced by performing polymerization and spinning in the same manner as in Comparative Example 1, except that the discharge amount of the spinning dope was 90% of that in Comparative Example 1, and spinning conditions were changed as shown in Table 1 below.

Examples 2 and 3

Carbon fiber precursor fiber bundles and carbon fiber bundles were produced in the same manner as in Example 1, except that the temperature difference (ΔT) between the spinning dope and the coagulation bath was changed as shown in Table 2 below.

Examples 4 to 6 and Comparative Example 4

Carbon fiber precursor fiber bundles and carbon fiber bundles were produced in the same manner as in Example 1, except that the molecular weight distribution of the polymer produced by polymerization was 1.6 and the temperature difference (ΔT) between the spinning dope and the coagulation bath was changed as shown in Table 1 below.

Comparative Examples 5 and 6

Carbon fiber precursor fiber bundles and carbon fiber bundles were produced in the same manner as in Example 1, except that the molecular weight distribution of the polymer produced by polymerization was 2.0 and the temperature difference (ΔT) between the spinning dope and the coagulation bath was changed as shown in Table 1 below.

Examples 7 to 9 and Comparative Example 7

Carbon fiber precursor fiber bundles and carbon fiber bundles were produced in the same manner as in Example 1, except that the molecular weight distribution of the polymer produced by polymerization was 1.6 and the temperature difference (ΔT) between the spinning dope and the coagulation bath was changed as shown in Table 2 below.

Comparative Example 8

A polyacrylonitrile-based precursor fiber bundle was produced by performing polymerization and spinning in the same manner as in Comparative Example 7, except that the discharge amount of the spinning dope was 70% of that in Comparative Example 1.

Test Example

Various molecular weights of the PAN-based polymers of Examples 1 to 9 and Comparative Examples 1 to 8, spinning conditions, and tensile properties of the obtained carbon fiber precursor fiber bundles were measured by the following methods, and the results are shown in Tables 1 and 2 below.

<Measurement of Molecular Weight and Molecular Weight Distribution of Polymer>

The liquid polymer was cast into a thin film, washed with running water for one day, and then dried, thus preparing a sample. The sample was dissolved in dimethylformamide at a concentration of 0.1 wt %, and the molecular weight of the obtained liquid sample was measured using a GPC instrument. A molecular weight distribution curve was obtained from the measured GPC curve, and the weight-average molecular weight (Mw) and number-average molecular weight (Mn) were calculated.

<Density Measurement>

1.0 to 3.0 g of the stabilized fiber bundle was taken and completely dried at 120° C. for 2 hours. Next, mass (A) (g) of the completely dried fiber was measured.

<Degree of Surface Layer Densification of Precursor Fiber>

Using methoxybenzene as a standard solution, UV transmittance was measured in the range of 380 to 480 nm using a UV-Vis spectrophotometer to determine the degree (%) of surface layer densification.

A precursor fiber bundle was deoiled, dried, and spread thinly to a width of 9 mm, thus preparing 10 samples. The degree (%) of surface layer densification was obtained from the average value for 10 samples, and the higher the value, the higher the densification.

<Extent of Cyclization Reaction (EOR %) in Stabilized Fiber>

For stabilized fiber, as the temperature increases in an air atmosphere, polymer cyclization proceeds. The surface of the stabilized fiber may be analyzed by FR-IR to obtain the peak intensities corresponding to the functional groups (C=N, C≡T) for the progress of molecular structure cyclization, and the extent of cyclization may be calculated using the following equation.

$$\text{Extent of reaction (EOR (\%))} = I(C=N)/[I(C\equiv N)+I(C=N)]$$

<Oxygen Content (%) in Stabilized Fiber>

The oxygen content in stabilized fiber was measured using an elemental analysis instrument.

<Average Single-Fiber Diameter of Carbon Fiber Bundle>

For a carbon fiber bundle composed of multiple carbon filaments to be measured, the mass per unit length $A_f$ (g/m) and the density $B_f$ (g/cm$^3$) were measured. The average single-fiber diameter of a carbon fiber bundle may be determined by preparing a resin tensile test sample, polishing the prepared sample, and observing the polished sample under an optical microscope.

<Measurement of Tensile Properties of Carbon Fiber as Resin Impregnated Strand>

The carbon fiber bundle produced in each of the Examples and the Comparative Examples was unwound, and the tensile properties of the stranded carbon fiber precursor fiber bundle were measured. For evaluation of the tensile properties of the carbon fibers, the tensile properties of the impregnated and cured carbon fiber strands in epoxy resin were measured in accordance with ISO 10618. At this time, measurement was performed on 10 carbon fiber precursor fiber bundles, the minimum and maximum values were removed, and the average values were expressed as strand tensile strength and strand tensile elongation.

TABLE 1

| | Polymer molecular weight distribution PD (Mw/Mn) | Temperature difference (ΔT) (° C.) between spinning dope and coagulation bath | Degree (%) of surface layer densification of precursor fiber bundle | Single-fiber diameter (μm) of stabilized fiber | Single-fiber diameter (μm) of carbon fiber | Tensile strength (GPa) of carbon fiber strand | Tensile elongation (%) of carbon fiber strand |
|---|---|---|---|---|---|---|---|
| Comparative Example 1 | 1.80 | 20 | 82.6 | 11.2 | 7.0 | 5.2 | 2.0 |
| Example 1 | | | 87.5 | 10.1 | 6.0 | 5.8 | 2.3 |
| Comparative Example 2 | | | 89.2 | 8.5 | 5.0 | 5.5 | 2.3 |
| Example 2 | 1.80 | 10 | 88.4 | 10.1 | 6.0 | 5.8 | 2.3 |
| Example 3 | | 30 | 90.8 | | 6.0 | 6.0 | 2.3 |
| Comparative Example 3 | | 40 | 85.1 | | | 5.2 | 2.1 |
| Example 4 | 1.60 | 10 | 91.5 | | 6.0 | 5.9 | 2.3 |
| Example 5 | | 20 | 91.5 | | | 6.2 | 2.5 |
| Example 6 | | 30 | 91.5 | | | 6.4 | 2.6 |
| Comparative Example 4 | | 40 | 82.2 | | | 5.5 | 2.5 |
| Comparative Example 5 | 2.00 | 10 | 79.5 | | | 5.0 | 1.9 |
| Comparative Example 6 | | 30 | 75.1 | | | 5.1 | 1.8 |

TABLE 2

| | Polymer molecular weight distribution (PD) | ΔT (°C) | Single-fiber diameter (m) of stabilized fiber | Extent of cyclization reaction (EOR) (%) in stabilized fiber | Oxygen content (%) in stabilized fiber | Single-fiber diameter (μm) of carbon fiber | Tensile strength (GPa) of carbon fiber strand | Tensile elongation (%) of carbon fiber strand |
|---|---|---|---|---|---|---|---|---|
| Example 7 | 1.60 | 20 | 10.1 | 86 | 6.5 | 6.0 | 6.2 | 2.4 |
| Example 8 | | | | 90 | 7.0 | | 6.4 | 2.5 |
| Example 9 | | | | 92 | 7.0 | | 6.1 | 2.3 |
| Comparative Example 7 | | | | 86 | 5.5 | | 5.4 | 1.9 |
| Comparative Examples | | | 8.5 | 94 | 8.2 | | 5.2 | 2.0 |

As shown in Tables 1 and 2 above, it can be confirmed that the carbon fiber bundles of Examples 7 to 9 exhibited a tensile strength of 5.8 GPa or more and a tensile elongation of 2.2% or more even when the single-fiber diameter of the carbon fiber was 6.0 μm or more, whereas the carbon fiber bundles of Comparative Examples 7 and 8 had poor tensile strength or tensile elongation, and thus are not suitable for use in pressure vessels requiring high pressure.

Although the present invention has been described in detail with reference to preferred embodiments, it will be understood by those skilled in the art that various changes or modifications may be made to the present invention. Accordingly, the present invention is not intended to be limited to the specific embodiments and is intended to include all embodiments falling within the scope of the appended claims and equivalents thereto.

The invention claimed is:

1. A polyacrylonitrile-based stabilized fiber satisfying conditions of the following Equations 1 and 2 while having a single-fiber diameter of 10.0 μm or more:

$$\mathrm{Log}(\rho) \geq (\alpha\beta)/100 \quad (1)$$

$$0.120 \leq (\alpha\beta)/100 \leq 0.135 \quad (2)$$

where $\rho$ denotes a density (g/cm$^3$) of the stabilized fiber, $\alpha$ denotes an extent of cyclization reaction (EOR (%)) in the stabilized fiber, and $\beta$ denotes an oxygen content (%) in the stabilized fiber.

2. A carbon fiber which is produced by carbonizing the polyacrylonitrile-based stabilized fiber of claim 1, wherein a single-fiber diameter of the carbon fiber is 6.0 μm or more, and a resin-impregnated strand of the carbon fiber has a tensile strength of 5.8 to 6.4 GPa.

3. A method for producing a carbon fiber, the method comprising: subjecting a polymer solution to dry-wet spinning in a coagulation bath having a solvent concentration of 30 to 40 wt % and containing water and the same solvent as a solvent used for polymerization, thereby forming a carbon fiber precursor fiber; drawing the obtained carbon fiber precursor fiber through a plurality of water washing baths; applying an oil agent to the drawn yarn, followed by drying and drawing to obtain a carbon fiber precursor fiber having a degree of surface layer densification of 65 to 70% at a wavelength of 380 nm and a degree of surface layer densification of 82 to 95% at a wavelength of 430 nm; and carbonizing the carbon fiber precursor fiber at a temperature of 1,000 to 1,400° C. to have a carbon fiber diameter of 6.0 μm or more.

4. The method according to claim 3, wherein the polymer has a weight-average molecular weight (Mw) of about 120,000 to 180,000 and a ratio of weight average molecular weight to number average molecular weight (Mw/Mn) of 1.6 to 1.8.

5. The method according to claim 3, wherein a temperature difference between the polymer solution and the coagulation bath during the spinning is 30° C. or lower.

6. The method according to claim 3, wherein the method comprises spinning the polymer solution by passage through a nozzle hole having a diameter of 0.12 to 0.18 mm.

7. A high-pressure vessel comprising: a pressure vessel body; and a fiber-reinforced resin layer composed of fiber-reinforced resin formed on a surface of the pressure vessel body; wherein the fiber of the fiber-reinforced resin layer is a carbon fiber produced by carbonizing the polyacrylonitrile-based stabilized fiber of claim 1, and wherein a single-fiber diameter of the carbon fiber is 6.0 μm or more, a number of filaments in a bundle of the carbon fiber is 24,000 to 36,000, and a resin-impregnated strand of the carbon fiber has a tensile strength is 5.8 to 6.4 GPa and a tensile elongation of 2.2 to 2.6%.

* * * * *

UNITED STATES PATENT AND TRADEMARK OFFICE
CERTIFICATE OF CORRECTION

Page 1 of 1

PATENT NO. : 12,410,542 B2
APPLICATION NO. : 18/007191
DATED : September 9, 2025
INVENTOR(S) : Jung et al.

It is certified that error appears in the above-identified patent and that said Letters Patent is hereby corrected as shown below:

In the Claims

Column 13, Line 37: Delete "$Log(\rho) \geq (\alpha\beta)/100$" and insert --$Log(\rho) \geq (\alpha/\beta)/100$--.

Column 13, Line 39: Delete "$0.120 \leq (\alpha\beta)/100 \leq 0.135$" and insert --$0.120 \leq (\alpha/\beta)/100 \leq 0.135$--.

Signed and Sealed this
Twenty-first Day of October, 2025

John A. Squires
*Director of the United States Patent and Trademark Office*